United States Patent
Von Der Haar et al.

[19]

[11] Patent Number: 6,137,859

[45] Date of Patent: Oct. 24, 2000

[54] METHOD FOR MANUFACTURING DETECTOR SYSTEM FOR A COMPUTED TOMOGRAPHY APPARATUS

[75] Inventors: Thomas Von Der Haar, Erlangen; Gerhard Kohl, Neunkirchen am Brand; Herbert Bruder, Hoechstadt, all of Germany

[73] Assignee: Siemens Aktiengesellschaft, Munich, Germany

[21] Appl. No.: 09/247,595

[22] Filed: Feb. 10, 1999

[30] Foreign Application Priority Data

Mar. 13, 1998 [DE] Germany ............................ 198 11 044

[51] Int. Cl.[7] .................................................. G01N 23/04
[52] U.S. Cl. ........................ 378/19; 250/366; 250/370.09
[58] Field of Search .................. 378/4, 19, 901; 250/336.11, 366, 370.01, 370.08, 370.09

[56] References Cited

U.S. PATENT DOCUMENTS

| | | | |
|---|---|---|---|
| 5,128,864 | 7/1992 | Waggener et al. | 378/14 |
| 5,293,312 | 3/1994 | Waggener | 378/14 |
| 5,307,264 | 4/1994 | Waggener et al. | 378/14 |

*Primary Examiner*—David V. Bruce
*Attorney, Agent, or Firm*—Hill & Simpson

[57] ABSTRACT

In a method for manufacturing a detector system composed of a number of detector elements respectively disposed at installation positions in a computed tomography (CT) apparatus, the detector elements are allocated to respective installation positions on the basis of a table that, for at least one image-relevant physical property, contains at least the allowable upper limit value or the allowable lower limit value for the individual installation positions for the deviation of the property with respect to a detector element occupying a neighboring installation position.

22 Claims, 4 Drawing Sheets

METHOD FOR MANUFACTURING DETECTOR SYSTEM FOR A COMPUTED TOMOGRAPHY APPARATUS

BACKGROUND OF THE INVENTION

1. Field of the Invention

The present invention is directed to a method for manufacturing a detector system, of the type having a number of detector elements respectively disposed at installation positions for a computed tomography (CT) apparatus, and is also directed to a method for manufacturing a detector system, of the type having a number of detector modules each containing a number of detector elements respectively disposed at installation positions, for a CT apparatus.

2. Description of the Prior Art

Detector systems that are composed of several hundred detector elements lying next to one another are utilized in CT apparatuses. In order to obtain artifact-free CT images, the parameters of image-relevant, physical properties (for example, z-gradient, spectral properties, radiation drift) of the detector elements cannot be permitted to exceed certain tolerances, and neighboring detector elements, moreover, may only deviate from one another with respect to these properties by a specific maximum amount. In CT apparatuses, these tolerances are generally dependent on the installation position of the detector elements in the detector system (for example, middle of the detector or outer region).

Either individual detector elements or detector modules composed of a number of detector elements, disposed in succession next to one another are produced for equipping detector systems with solid-state detector elements. Since the detector elements are selected from an inventory and since they are not identical in terms of the aforementioned image-relevant properties, these properties will vary from neighboring element-to-element when the detector elements are installed.

The problem of installing detector elements as effectively as possible in the detector system such that all demands in view of the aforementioned tolerances are met for every installation position in the detector system arises in the manufacture of detector systems.

In a method currently employed by the assignee (Siemens AG) for manufacturing a detector system constructed on the basis of detector modules, all image-relevant physical properties of the individual detector elements of the detector modules to be taken into consideration are measured before installation at a test assembly and are stored in a data bank. Subsequently, the detector modules (composed of a number of detector elements) are classified only according to the average values of their detector elements with respect to z-gradient and spectral properties, and are sorted for storage physically separated according to those classes. Only detector modules from a specific class are then installed for a specific module position for a specific detector system.

Since, however, not all image-relevant physical properties and not all properties of individual detector elements or groups of detector elements, but only averages thereof are taken into consideration in the sorting, ring artifacts or other image errors can consequently occur in the CT image. In order to be able to recognize and eliminate these artifacts, the detector system is built into a test assembly (for example, a CT apparatus) wherein any artifacts which arise are eliminated by replacing detector modules by trial-and-error, thus resulting in a time-intensive procedure. Each of these correction steps requires the partial dismantling of the detector system, the removal of the unsuited detector module, the installation of the new detector module and the reassembly of the detector system. Subsequently, the CT apparatus may have to be recalibrated and a number of testing steps may have to be repeated.

A very complicated warehouse with a correspondingly high inventory is also necessary due to the described formation of classes.

Finally, this method produces a relatively high rejection rate since not all classes can be adequately filled.

Image-relevant properties, for example the spectral properties and the radiation drift, other than those cited above are not taken into consideration at all.

SUMMARY OF THE INVENTION

An object of the present invention is to provide a method of the type described above that enables equipping a detector system to consistently achieve a high image quality with substantially reduced production and testing outlay.

The above object is achieved in accordance with the principles of the present invention in a method for manufacturing a detector system for a computed tomography apparatus, the detector system including a number of detector elements which are allocated to respective installation positions of the detector system, wherein more detector elements are initially provided than are actually needed to fill the respective installation positions of the detector system, wherein at least one image-relevant physical property of each detector element is measured and the measured properties are stored in a data bank in an identifiable manner associated with the respective detector elements which produced the measured property, and wherein detector elements are respectively selected for the installation positions of the detector system on the basis of a table that, for the aforementioned property, contains an allowable upper limit value or an allowable lower limit value for each installation position, these limit values representing the permissible deviation of the property with respect to at least one detector element which will occupy a neighboring installation position. Each detector element is selected for each installation position so that the measured property of the detector element is within the limit value or values designated in the table for the respective installation positions. The selection of the detector elements for the individual installation positions proceeds by selecting a first detector element for a first installation position, selecting a detector element for installation position neighboring the first installation position on the basis of a table, selecting another detector element for an installation position neighboring an installation position for one of the already-selected detector elements on the basis of the table, and repeating these steps until a detector element has been respectively selected for each of the installation positions. The detector system is then subsequently assembled according to the detector elements selected in the aforementioned manner, so that the detector elements are physically placed in the respective installation positions to which they were allocated in the selection procedure.

The image-relevant physical property can be one or more of detector signal strength, z-gradient (i.e., the z-axis dependency of the signal strength), one or more spectral properties, radiation drift, persistence, and/or temperature drift.

The inventive method can be employed as well for manufacturing a detector system constructed of a number of detector modules, with each detector module containing a number of detector elements. The inventive method can be employed for assembling a single-row detector system as well as for assembling a multi-row detector system.

DESCRIPTION OF THE PREFERRED EMBODIMENTS

Figure 1:
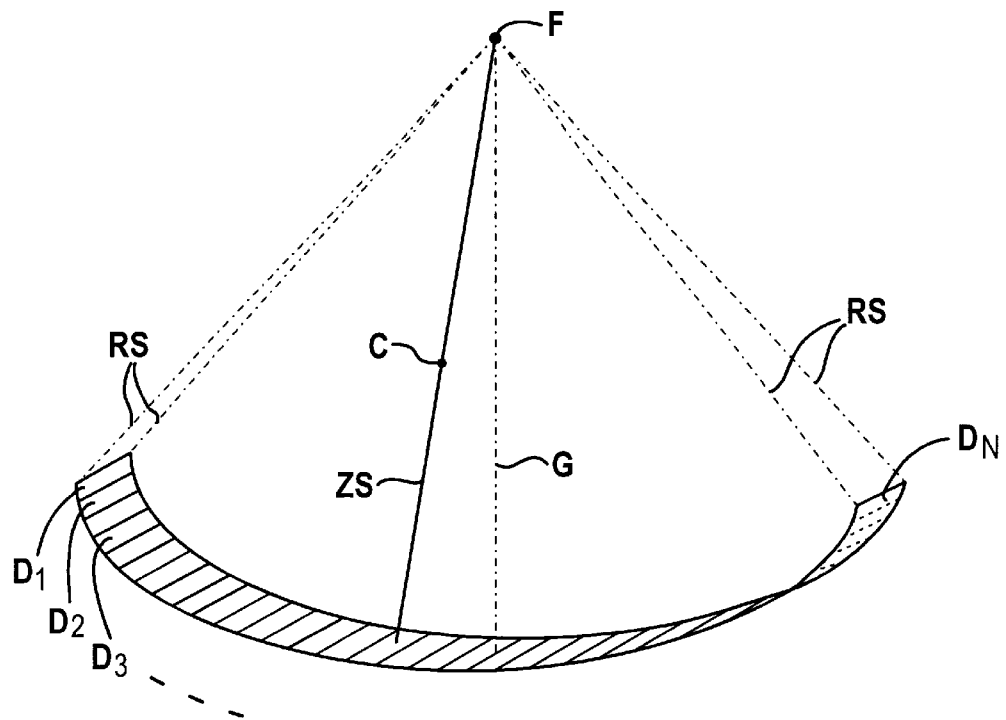
FIG. 1 is a schematic illustration of a detector system of a CT apparatus constructed from a single row of individual detector elements.

FIG. 1 shows a typical detector system DS, of a type employed in a CT apparatus of the third generation. The detector system $DS_1$ has a curved arrangement of N detector elements $D_1$ through $D_N$ respectively at installation positions 1 through N, that are arranged such that they are struck by an X-ray beam, gated so as to be fan-shaped, emanating from the focus F of an X-ray source (not shown). The edge rays of this X-ray beam are referenced RS.

As is standard in modem CT apparatuses, the central ray (referenced ZS) of the fan-shaped X-ray beam does not coincide with the connecting straight-line (referenced G) between the detector middle and the focus F, but is offset relative to this connecting straight-line.

The pivot point C around which the detector system $DS_1$ and the X-ray source rotate in a known way during operation of the CT apparatus lies on the central ray ZS.

Figure 2:
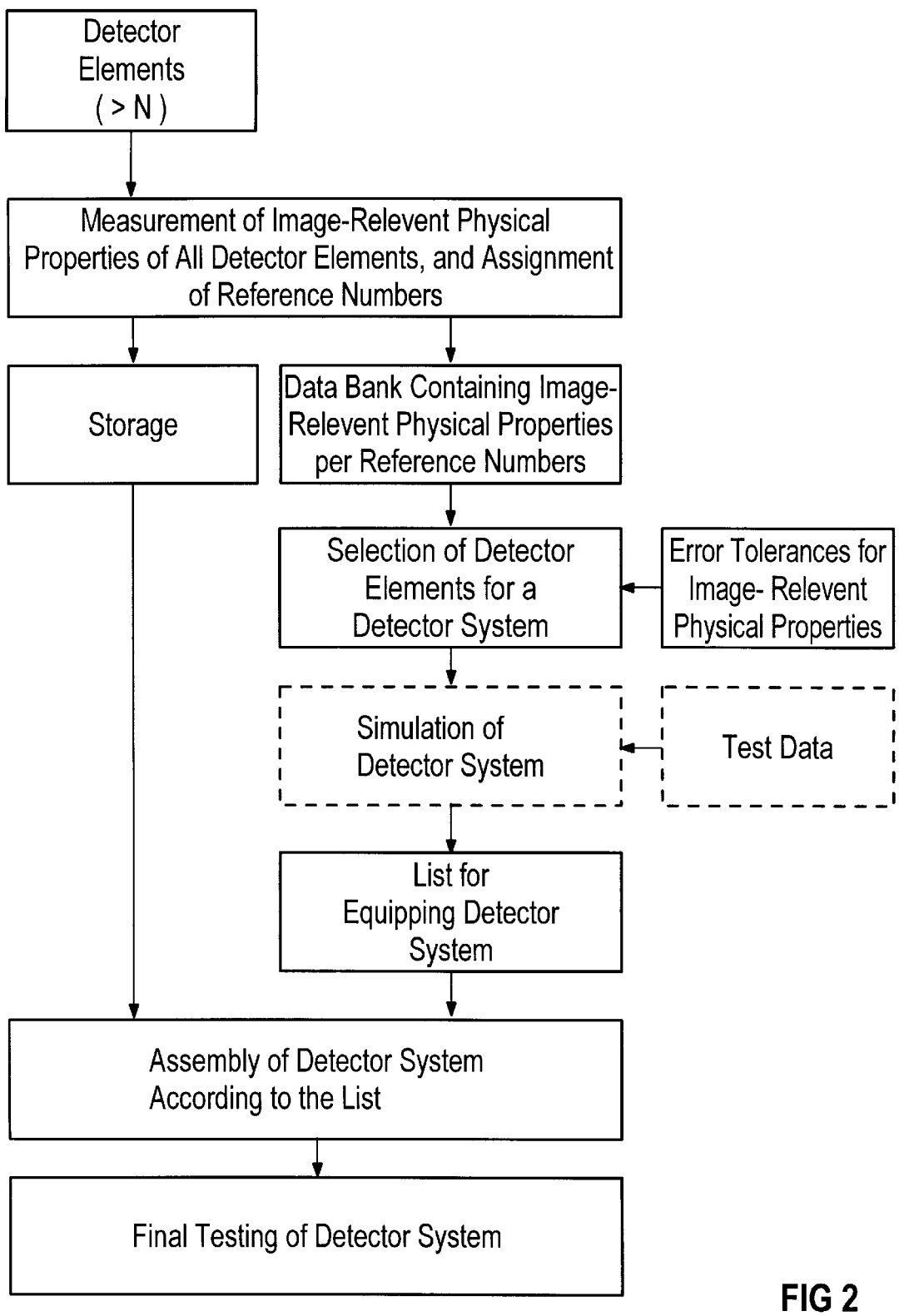
FIG. 2 is a flowchart of the inventive method for manufacturing a detector system according to FIG. 1.

For manufacturing a detector system $DS_1$ according to FIG. 1 in conformity with the inventive method according to FIG. 2, all image-relevant physical properties of a larger number of detector elements that N are initially measured at a test assembly before installation as is also done in conventional methods. A reference number is assigned to every detector element, and the measured values are stored according to FIG. 2 in a data bank under this reference number.

A division into classes with a corresponding sorted inventory storing, however, is eliminated. Instead, all detector elements are stored in inventory unclassified according to FIG. 2, under their reference number, this being administered by a computer when, according to a version of the invention, the implementation of the method ensues computer-supported. The size of the inventory of detector elements to be kept on hand thus can be reduced to a fraction of the number required given a class formation, since individual classes need not be filled with an adequately high number of detector elements.

The detector elements provided for equipping a detector system are selected for installation with computer-support in the following way.

Beginning, for example, in the middle of the detector row, the detector system $DS_1$ is compiled detector element-by-detector element. Given each detector element to be newly selected, or to be added to the detector elements already selected, a check is made according to FIG. 2 with regard to all image-relevant physical properties to be taken into consideration as to whether the element in question fits within the scope of allowable error tolerances vis-a-vis the neighboring detector elements. The allowable error tolerances with respect to immediately neighboring detector elements that have already been selected are stored in the computer in a suitable form, for example in tables, for every installation positions and for each image-relevant property. These error tolerances, which are stored in the form of upper and lower limit values, are known from measurements of implemented detector systems having high image quality.

Apart from adhering to certain minimum demands, thus, a detector element to be newly added need not meet an absolute criterion in view of the image-relevant physical properties (as must occur given a division into classes) but merely has to match the properties of the neighboring elements with respect to the scope of a certain range of tolerances. A far greater flexibility, and thus a far lower rejection rate compared to the formation of classes, are achieved by this selection according to differential deviations.

Alternatively, with respect to one or more other image-relevant physical properties, the selection can ensue such that a detector element must adhere to an allowable upper and lower (absolute) limit value in order to be suited for this installation position.

When a detector element that is intended for a specific installation position satisfies the corresponding limit values, then it is selected, i.e. the computer stores the reference number and the installation position of this detector element for the later assembly of the detector system.

When, in the described check for suitability for a specific installation position, a detector element considered for an installation position does not meet the corresponding error tolerance with respect to even only one image-relevant physical property which is taken into consideration, then it is discarded, i.e. is placed farther down, so to speak, in the data bank. The computer then takes the next detector element from the data bank and checks it for its suitability. Several thousand detector element scan be tested within a very short time in this way.

If no suitable detector element at all is found for a specific installation position, then one or more previously selected detector elements are in turn discarded, i.e. the reference number and installation position are deleted, and are replaced by others until suitable detector elements have been found for all installation positions.

An equipping of the detector system that meets all demands can be compiled within seconds with a computer in the described way.

In a CT apparatus of the third generation, moreover, the demands on the image-relevant properties of the detector elements decrease with the distance of the installation position to be equipped from the middle of the detector, so that detector elements that deviate considerably from the ideal in view of the image-relevant physical properties can be installed in the installation positions lying in the outer regions of the detector system and need not be discarded as rejects.

By contrast to the conventional methods, thus, the selection of the detector elements and optimization of the equipping of the detector system are not implemented in the CT apparatus but on the basis of a data bank, preferably with a computer, taking all desired, image-relevant properties of the detector elements and of the detector system into consideration.

By equipping the detector system in the described way, CT images acquired with a thus-equipped detector system can be simulated on the basis of already existing test data and the intensities of artifacts which can be expected in these CT images can be simulated as desired (these steps being optional and therefore shown with dashed outlines in FIG. 2) in order to be able to draw conclusions about the image quality that can be obtained with the respective equipping of the detector system.

The equipping of the "virtual" detector system determined in the described way is produced as a computer output in the form of a list that contains the reference numbers of the selected detector elements for the individual installation positions. The detector system is "physically" assembled on the basis of the list and is subsequently tested for functionability in a final test. When detector errors (for example a faulty detector element) occur in this final test, the replacement elements are again selected by the computer in the described way.

In a corresponding way, a targeted replacement of detector elements can also be undertaken at the use site of the CT apparatus after a faulty detector element has been identified, for example by remote diagnosis, i.e. remote diagnosis via a data network, and a suitable replacement element has been found by the computer.

When a parameter of a group of a number of detector elements lying next to one another deviates significantly from the other detector elements, then artifacts in the form of broad rings can arise in the CT image, for example given an apparatus of the third generation, and these rings cannot be eliminated by subsequent corrections (image post-processing). Given the method disclosed herein, the influence on the CT image of detector element groups (two or more detector elements lying next to one another, or close to one another) is therefore also taken into consideration, namely by selecting the limit values allocated to a number of neighboring installation positions such that these artifacts cannot occur.

In a CT apparatus of, for example, the third generation, the signals of the detector elements that lie opposite one another with respect to the central ray (complementary detector elements; see, for example, the two shaded detector elements in FIG. 1) contribute to the same image area. In order to prevent detector errors of such complementary detector elements from adding (tolerance build-up), the resultant aggregate error of complementary detector elements is taken into consideration in the equipping. It is thereby taken into account that the detector middle, as shown in FIG. 1, is generally offset relative to the central ray (alignment ≠0).

The following image-relevant physical properties are preferably measured and taken into consideration in the selection of a detector element for a specific installation position:

detector signal strength: relative size of the electrical output signal of the detector element;

z-gradient: spatial dependency of the signal strength in the direction perpendicular to the fan beam plane of the apparatus;

spectral properties: variation of the signal strength of the detector element dependent on the spectral composition of the X-radiation incident onto the element;

radiation drift: variation of the detector signal strength dependent on the preceding X-irradiation;

persistence: decay behavior of the detector signal;

temperature drift: variation of the detector signal strength dependent on the temperature of the detector element.

Figure 3:
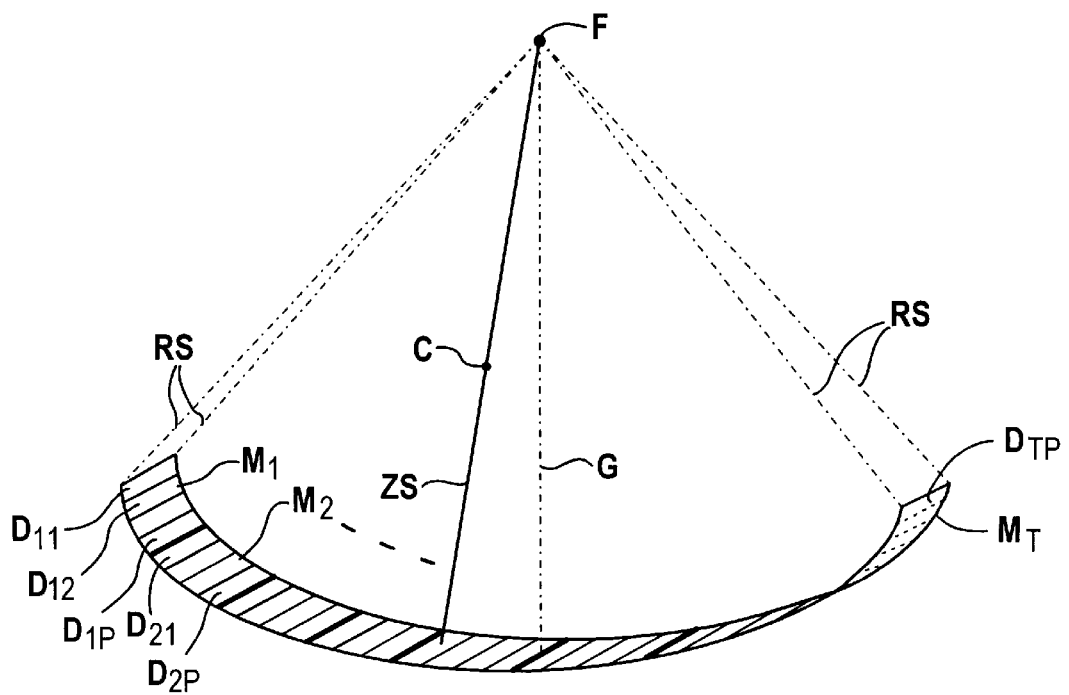
FIG. 3 is a schematic illustration of a detector system of a CT apparatus constructed from a single row of detector modules respectively containing a number of detector elements.
Figure 4:
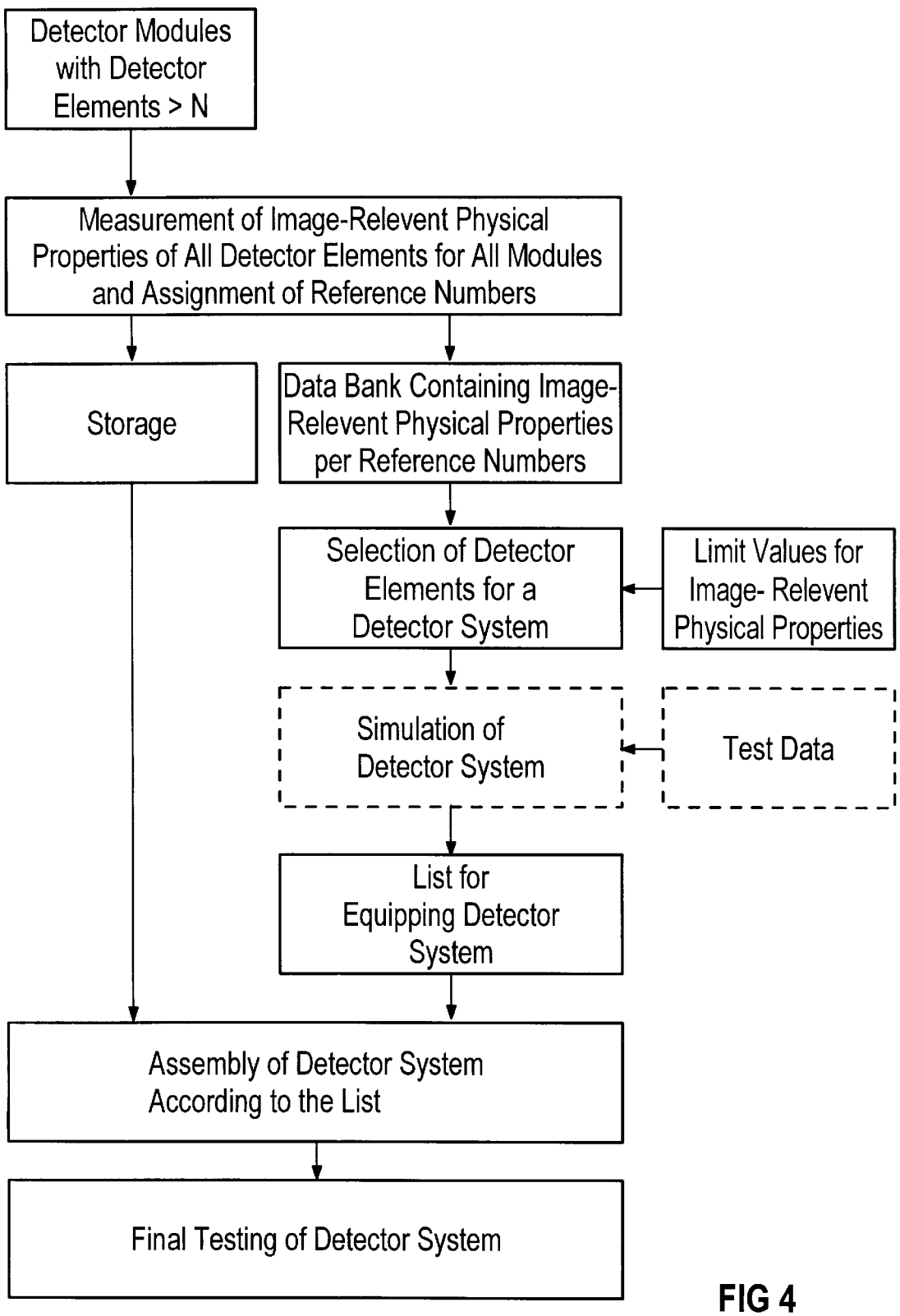
FIG. 4 is a flowchart of the inventive method for manufacturing a detector system according to FIG. 3.

The inventive method can also be employed in conjunction with detector systems that, like the detector system $DS_M$ according to FIG. 3, are composed of a number, for example T, detector modules $M_1$ through $M_T$, with each detector module $M_1$ through $M_T$ being allocated to a module position 1 through M and each detector module $M_1$ through $M_T$ contains a number, for example P, of detector elements $D_{1P}$, $D_{21}$ to $D_{2P}$, etc., through $D_{M1}$ through $D_{TP}$. The modules $M_1$ through $M_T$ are respectively allocated to installation positions 11 through TP of the detector system $DS_M$. In this case, it must be assured in the way illustrated in FIG. 4 that all detector elements of a module exhibit the properties pertaining to the respective installation position for that module.

The inventive method can also be applied to multi-row detector systems.

Figure 5:
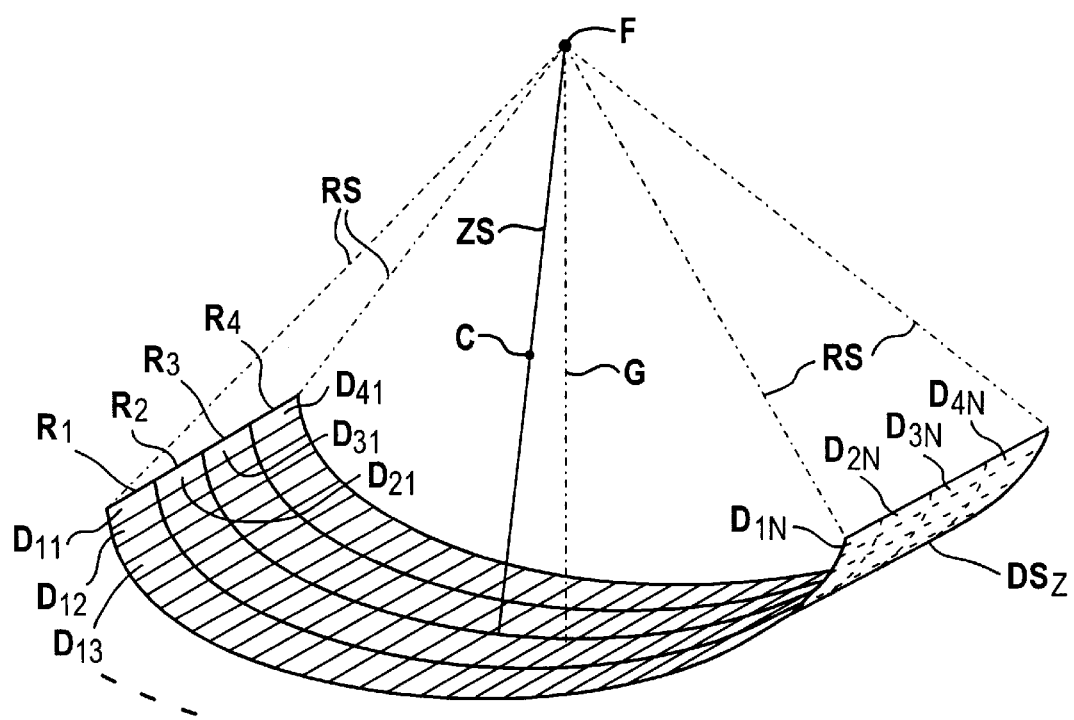
FIG. 5 is a schematic illustration of a detector system of a CT apparatus constructed from multiple rows of individual detector elements.

Multi-row detector systems are detector systems that, like the detector system $DS_A$ according to FIG. 5, are composed of two or more, for example four, mutually independent rows $R_1$ through $R_4$ each having N detector elements in the z-direction and, accordingly, include the detector elements $D_{11}$ through $D_{4N}$ each being allocated to an installation position 11 through 4N of the detector system $DS_Z$.

Given multi-row detector systems, the superimposition of detector signals of detector elements of different rows can lead to a mutual intensification or compensation of detector errors. In multi-row detector systems, thus, the detector properties of detector elements of directly neighboring or more greatly distanced detector rows as well are also considered in the sorting, analogous to the single-row detector system. The sorting is thus expanded onto the z-direction (direction perpendicular to the middle plane of the fan beam) to the effect that errors of the detector elements compensate or at least do not intensify in this direction either.

In multi-row detector systems, it is possible to interconnect detector rows neighboring in the z-direction in order to obtain a larger slice width. In this case, the z-gradient is defined by the z-dependency of the signal strength of the interconnected detector elements.

In the selection of the detector elements for the individual installation positions, all slice modes obtained by interconnection of detector rows during operation of the CT apparatus are taken into consideration, particularly in view of the z-gradient. A detector element is allowed to be installed only when it meets the conditions established for the intended installation location in all slice modes. The image-relevant properties of the detector elements of the detector rows interconnected in this way are thereby taken into consideration in a procedure analogous to a single-row detector system.

The properties of the inventive method can be summarized as follows:

Preferably computer-supported, an optimum allocation of the detector elements in the detector system is determined on the basis of image-relevant properties of the individual detector elements that are previously mensurationally identified.

Dependent on the respective installation position of a detector element in the detector system, the method is based on predetermined, different error tolerances.

The influence of the image-relevant properties of individual detectors as well as of groups of individual detectors can be taken into account, and thus not only the influence of the image-relevant properties of immediately neighboring detector elements is accounted for but also the influence of detector elements lying farther apart.

The method can be employed for detector systems of CT apparatus of the second, third and fourth generation. In the case of the third generation, the method can consider the at least partial superimposition of signals arising from detector elements lying opposite one another (complementary) in the detector system with respect to the central ray.

The inventive method also can take into account offset of the middle of the detector system relative to the central ray of the incident X-ray beam onto the detector system.

Since the z-gradient of the detector element can be taken into consideration in the selection of a detector element for a specific installation position, there is the possibility of avoiding image artifacts that can arise in the examination of subjects with a transparency that varies in the z-direction.

By taking the (relative) detector signal strength into consideration in the selection of a detector element for a specific installation position, there is the possibility of avoiding image artifacts due to under-drive or over-drive of a channel of the data acquisition system of the CT apparatus connected to the corresponding detector element.

Further, image artifacts that can arise after irradiation of the detector system with intense radiation can be avoided because the radiation drift of the detector elements is taken into consideration in the selection of each detector element for a specific installation position.

Since there is also the possibility of taking the spectral properties of the detector elements into consideration in the selection of a detector element for a specific installation position, image artifacts can be avoided in the examination of subjects having different degrees of hardening effect for X-rays.

Further, image artifacts due to different degrees of persistence of the detector elements employed in a detector system can be avoided when the persistence behavior of the detector elements is taken into consideration in the selection of a detector element for a specific installation position.

When the temperature drift of the detector elements is taken into consideration in the selection of a detector element for the respective installation positions, there is also the possibility of avoiding image artifacts caused by temperature variations of the detector system.

On the basis of the inventive method, moreover, it is possible to subsequently replace one or more detector elements of a detector system equipped according to the inventive method by finding in the data bank one or more detector elements suited in view of all image-relevant properties to be taken into account. If no suitable detector element is present, then neighboring or complementary detector elements are also replaced, until an equipping of the detector system that corresponds to all demands is again achieved. The replacement of one or more faulty detector elements need not take place at the location of the detector element fabrication; on the contrary, the replacement can be undertaken at the location at which the CT apparatus is erected, particularly when faulty detector elements can be identified by remote diagnosis.

The inventive method is also suitable for multi-row detector systems, by taking into consideration the image-relevant properties of detector elements of directly neighboring detector rows or detector rows at a greater distance. For this purpose the selection of the detector elements for the individual installation positions proceeds analogously to the selection for a single-row detector system. It is particularly taken into consideration that errors from detector elements compensate or at least do not intensify, in the case of superimposition of detector signals that arise from different rows. Additionally, there is the possibility in multi-row detector systems that neighboring detector rows are interconnected in certain operating modes, which can also be taken into account in the selection procedure.

Important advantages of the inventive method are:

elimination of measuring and other work stations in the detector fabrication;

greatly simplified and reduced warehousing;

shortened throughput times in the detector fabrication;

constant image quality;

reduction of the rejects in the selection of the detector elements and the final test to approximately zero;

replacement of detector elements and detector modules at the operating location of the CT apparatus possible;

suitability for multi-row detector systems;

very little hardware outlay given computer-supported implementation, namely standard PC.

The method has been disclosed above as a computer-supported method. Although it would not be very efficient, it is nonetheless possible to also implement the method without computer support, for example in that the data acquisition and administration required for the implementation of the method ensues with card-file cards.

Although modifications and changes may be suggested by those skilled in the art, it is the intention of the inventors to embody within the patent warranted hereon all changes and modifications as reasonably and properly come within the scope of their contribution to the art.

We claim as our invention:

1. A method for manufacturing a detector system for a computed tomography apparatus, said detector system comprising at least one row of a number of detector elements disposed side-by-side in said row at respective successively neighboring installation positions, said method comprising the steps of:

(a) providing a plurality of detector elements exceeding said number of detector elements in said at least one row;

(b) determining a value of an image-relevant physical property for each detector element in said plurality of detector elements and storing said image-relevant physical property values in a data bank in an identifiable manner respectively associated with said plurality of detector elements;

(c) providing a table that, for each of said installation positions, contains at least one limit value for a permissible deviation of said image-relevant physical property that a detector element occupying each installation position can have relative to a detector element occupying a neighboring installation position;

(d) selecting detector elements from among said plurality of detector elements to respectively occupy said installation positions using said data bank and said table by (d1) selecting a first of said detector elements to occupy a first of said installation positions;

(d2) selecting another of said detector elements according to said table to occupy another of said installation positions neighboring said first installation position, (d3) selecting another of said detector elements according to said table to occupy another of said installation positions neighboring one of the installation positions occupied in steps (d1) or (d2), and (d4) repeating step (d3) until all of said installation positions are respectively occupied with detector elements; and (e) assembling a detector system with the detector elements selected in step (d) disposed at the respective installation positions occupied in step (d).

2. A method as claimed in claim 1 wherein said computed tomography apparatus has a z-axis, and comprising the additional step of selecting said image-relevant physical property from the group of image-relevant physical properties consisting of detector signal strength, detector signal variation along said z-axis, at least one spectral property, radiation drift, persistence, and temperature drift.

3. A method as claimed in claim 1 wherein said value of an image-relevant physical property for each detector element comprises a value of a first image-relevant physical property for each detector element, and wherein step (b) further comprises determining a value of a second image-relevant physical property for each detector element in said plurality of detector elements and storing the respective values of said first image-relevant physical property and said second image-relevant physical property in said data bank in said identifiable manner respectively associated with said detector elements, and wherein step (c) comprises providing a table that, for each of said installation positions, contains said at least one limit value for said first image-relevant physical property, and contains a further limit value for said second image-relevant physical property that a detector element occupying each installation position can have, without any deviation, relevant to a detector element occupying a neighboring installation position, said further limit value being selected from the group of further limit values comprising an upper further limit value and a lower further limit value.

4. A method as claimed in claim 3 wherein said computed tomography apparatus has a z-axis, and comprising the additional step of selecting said second image-relevant physical property from the group of image-relevant physical properties consisting of detector signal strength, detector signal variation along said z-axis, at least one spectral property, radiation drift, persistence, and temperature drift.

5. A method as claimed in claim 1 wherein said at least one row of detector elements has an installation position comprising a middle installation position, and wherein step (d1) comprises selecting said first of said detector elements to occupy said middle installation position as said first of said installation positions.

6. A method as claimed in claim 1 wherein step (d2) further comprises the step of, if no detector element from among said plurality of detector elements can be found according to said table, selecting a different detector element as said first detector element and repeating step (d2), and wherein step (d3) comprises the additional step of, if no detector element from among said plurality of detector elements can be found according to said table, selecting a different detector element in step (d2) and repeating step (d3).

7. A method as claimed in claim I for manufacturing a detector system for a third generation computed tomography apparatus having an X-ray source which emits a fan-shaped X-ray beam having a central ray onto said detector system, said detector system having detector elements respectively occupying complementary installation positions with respect to said central ray, and wherein step (d) further comprises selecting two detector elements to respectively occupy any pair of complementary installation positions so that a sum of respective absolute values of respective deviations of the value of said image-relevant physical property from installation positions respectively neighboring said complementary installation positions does not exceed said at least one limit value.

8. A method as claimed in claim 7 wherein said value of an image-relevant physical property for each detector element comprises a value of a first image-relevant physical property for each detector element, and wherein step (b) further comprises determining a value of a second image-relevant physical property for each detector element in said plurality of detector elements and storing the respective values of said first image-relevant physical property and said second image-relevant physical property in said data bank in said identifiable manner respectively associated with said detector elements, and wherein step (c) comprises providing a table that, for each of said installation positions, contains said at least one limit value for said first image-relevant physical property, and contains a further limit value for said second image-relevant physical property that a detector element occupying each installation position can have, without any deviation, relevant to a detector element occupying a neighboring installation position, said further limit value being selected from the group of further limit values comprising an upper further limit value and a lower further limit value, and wherein step (d) further comprises selecting said two detector elements to respectively occupy any pair of complementary installation positions so that a sum of respective absolute values of respective deviations of the value of said second image-relevant physical property from installation positions respectively neighboring said complementary installation positions does not exceed said at least one limit value.

9. A method as claimed in claim 1 comprising the additional step of assigning a reference number to each of said detector elements selected to occupy an installation position in step (d), and producing a list of said reference numbers correlated to the respective installation positions, and wherein step (e) comprises assembling said detector system using said list.

10. A method as claimed in claim 1 wherein step (d) results in a remainder of unselected detector elements in said plurality of detector elements which were not selected to occupy an installation position in step (d), and comprising the additional step of:
(f) conducting a final check of the detector system assembled in step (e) and, for any detector element which is found in said final check to be a faulty detector element, replacing said faulty detector element with a detector element selected according to step (d) from among said remainder of unselected detector elements.

11. A method as claimed in claim 1 comprising conducting storing of said image-relevant physical properties in said data bank, and step (c), and step (d) in a computer.

12. A method for manufacturing a detector system for a computed tomography apparatus, said detector system comprising at least one row of a number of detector modules disposed side-by-side in said row at respective successively neighboring installation positions, each of said modules comprising a plurality of detector elements disposed side-by-side, said method comprising the steps of:
(a) providing a plurality of detector modules exceeding said number of detector elements in said at least one row;
(b) determining a value of an image-relevant physical property for each detector element in each of said plurality of detector modules and storing said image-relevant physical property values in a data bank in an identifiable manner respectively associated with said plurality of detector elements;
(c) providing a table that, for each of said installation positions, contains at least one limit value for a permissible deviation of said image-relevant physical property that a detector element in a module occupying each installation position can have relative to a detector element in a module occupying a neighboring installation position;

(d) selecting detector modules from among said plurality of detector modules to respectively occupy said installation positions using said data bank and said table by
  (d1) selecting a first of said detector modules to occupy a first of said installation positions;
  (d2) selecting another of said detector modules according to said table to occupy another of said installation positions neighboring said first installation position,
  (d3) selecting another of said detector modules according to said table to occupy another of said installation positions neighboring one of the installation positions occupied in steps (d1) or (d2), and
  (d4) repeating step (d3) until all of said installation positions are respectively occupied with detector modules; and
(e) assembling a detector system with the detector modules selected in step (d) disposed at the respective installation positions occupied in step (d).

13. A method as claimed in claim 12 wherein said computed tomography apparatus has a z-axis, and comprising the additional step of selecting said image-relevant physical property from the group of image-relevant physical properties consisting of detector signal strength, detector signal variation along said z-axis, at least one spectral property, radiation drift, persistence, and temperature drift.

14. A method as claimed in claim 12 wherein said value of an image-relevant physical property for each detector element comprises a value of a first image-relevant physical property for each detector element, and wherein step (b) further comprises determining a value of a second image-relevant physical property for each detector element in said plurality of detector modules and storing the respective values of said first image-relevant physical property and said second image-relevant physical property in said data bank in said identifiable manner respectively associated with said detector elements, and wherein step (c) comprises providing a table that, for each of said installation positions, contains said at least one limit value for said first image-relevant physical property, and contains a further limit value for said second image-relevant physical property that a detector element in a module occupying each installation position can have, without any deviation, relevant to a detector element in a module occupying a neighboring installation position, said further limit value being selected from the group of further limit values comprising an upper further limit value and a lower further limit value.

15. A method as claimed in claim 14 wherein said computed tomography apparatus has a z-axis, and comprising the additional step of selecting said second image-relevant physical property from the group of image-relevant physical properties consisting of detector signal strength, detector signal variation along said z-axis, at least one spectral property, radiation drift, persistence, and temperature drift.

16. A method as claimed in claim 12 wherein said at least one row of detector modules has an installation position with a detector element at a middle of said row, and wherein step (d1) comprises selecting said first of said detector modules to occupy said installation position with said detector element at said middle of said row as said first of said installation positions.

17. A method as claimed in claim 12 wherein step (d2) further comprises the step of, if no detector module from among said plurality of detector modules can be found according to said table, selecting a different detector module as said first detector element and repeating step (d2), and wherein step (d3) comprises the additional step of, if no detector module from among said plurality of detector modules can be found according to said table, selecting a different detector module in step (d2) and repeating step (d3).

18. A method as claimed in claim 12 for manufacturing a detector system for a third generation computed tomography apparatus having an X-ray source which emits a fan-shaped X-ray beam having a central ray onto said detector system, said detector system having detector modules respectively occupying complementary installation positions with respect to said central ray, and wherein step (d) further comprises selecting two detector modules to respectively occupy any pair of complementary installation positions so that a sum of respective absolute values of respective deviations of the value of said image-relevant physical property from installation positions respectively neighboring said complementary installation positions does not exceed said at least one limit value.

19. A method as claimed in claim 18 wherein said value of an image-relevant physical property for each detector element comprises a value of a first image-relevant physical property for each detector element in each of said modules, and wherein step (b) further comprises determining a value of a second image-relevant physical property for each detector element in each of said plurality of detector modules and storing the respective values of said first image-relevant physical property and said second image-relevant physical property in said data bank in said identifiable manner respectively associated with said detector elements, and wherein step (c) comprises providing a table that, for each of said installation positions, contains said at least one limit value for said first image-relevant physical property, and contains a further limit value for said second image-relevant physical property that a detector element in a module occupying each installation position can have, without any deviation, relevant to a detector element in a module occupying a neighboring installation position, said further limit value being selected from the group of further limit values comprising an upper further limit value and a lower further limit value, and wherein step (d) further comprises selecting two detector modules to respectively occupy any pair of complementary installation positions so that a sum of respective absolute values of respective deviations of the value of said image-relevant physical property from installation positions respectively neighboring said complementary installation positions does not exceed said at least one limit value.

20. A method as claimed in claim 12 comprising the additional step of assigning a reference number to each of said detector modules selected to occupy an installation position in step (d), and producing a list of said reference numbers correlated to the respective installation positions, and wherein step (e) comprises assembling said detector system using said list.

21. A method as claimed in claim 12 wherein step (d) results in a remainder of unselected detector modules in said plurality of detector modules which were not selected to occupy an installation position in step (d), and comprising the additional step of:
  (f) conducting a final check of the detector system assembled in step (e) and, for any detector module which is found in said final check to be a faulty detector module, replacing said faulty detector module with a detector module selected according to step (d) from among said remainder of unselected detector modules.

22. A method as claimed in claim 12 comprising conducting storing of said image-relevant physical properties in said data bank, and step (c), and step (d) in a computer.

* * * * *